United States Patent [19]

Caldwell et al.

[11] Patent Number: 4,483,816
[45] Date of Patent: Nov. 20, 1984

[54] APPARATUS AND METHOD FOR QUANTITATIVE ASSAY OF GENERIC TRANSURANIC WASTES FROM NUCLEAR REACTORS

[75] Inventors: John T. Caldwell, Los Alamos; Walter E. Kunz, Santa Fe; James D. Atencio, Los Alamos, all of N. Mex.

[73] Assignee: The United States of America as represented by the Department of Energy, Washington, D.C.

[21] Appl. No.: 363,979

[22] Filed: Mar. 31, 1982

[51] Int. Cl.$^3$ .............................................. G21G 1/12
[52] U.S. Cl. .................................... 376/158; 376/156; 376/170; 376/181; 376/182; 376/189; 376/245
[58] Field of Search ............... 376/153, 154, 158, 164, 376/159, 245, 156, 170, 181, 182, 189; 250/390, 391, 363 R

[56] References Cited

PUBLICATIONS

Kunz, et al; "1 nCi/g Sensitivity Transuranic Waste Assay System Using Pulsed Neutron Interrogation," Proceedings, 21st Annual Meeting of the Institute of Nuclear Materials Management; Palm Beach, FL; Jun. 30–Jul. 2, 1980; vol. IX, p. 131 (Published Nov. 1, 1980).
Kunz, et al; "A 1 mg–Sensitivity Fissile Assay System"; 3rd ESARDA Symposium on Safeguards & Nuclear Material Management; Karlsruhe, F. R. Germany G–8 May 1981.

Primary Examiner—Donald P. Walsh
Attorney, Agent, or Firm—Samuel M. Freund; Paul D. Gaetjens; Michael F. Esposito

[57] ABSTRACT

A combination of passive and active neutron measurements which yields quantitative information about the isotopic composition of transuranic wastes from nuclear power or weapons material manufacture reactors is described. From the measurement of prompt and delayed neutron emission and the incidence of two coincidentally emitted neutrons from induced fission of fissile material in the sample, one can quantify $^{233}$U, $^{235}$U and $^{239}$Pu isotopes in waste samples. Passive coincidence counting, including neutron multiplicity measurement and determination of the overall passive neutron flux additionally enables the separate quantitative evaluation of spontaneous fission isotopes such as $^{240}$Pu, $^{244}$Cm and $^{252}$Cf, and the spontaneous alpha particle emitter $^{241}$Am. These seven isotopes are the most important constituents of wastes from nuclear power reactors and once the mass of each isotope present is determined by the apparatus and method of the instant invention, the overall alpha particle activity can be determined to better than 1 nCi/g from known radioactivity data. Therefore, in addition to the quantitative analysis of the waste sample useful for later reclamation purposes, the alpha particle activity can be determined to decide whether "permanent" low-level burial is appropriate for the waste sample.

5 Claims, 7 Drawing Figures

APPARATUS AND METHOD FOR QUANTITATIVE ASSAY OF GENERIC TRANSURANIC WASTES FROM NUCLEAR REACTORS

This invention is the result of a contract with the Department of Energy (Contract No. W-7405-ENG-36).

BACKGROUND OF THE INVENTION

Generic transuranic waste is defined to be nuclear waste of unknown composition that principally includes $^{233}$U, $^{235}$U, $^{239}$Pu, $^{240}$Pu, $^{241}$Am, $^{244}$Cm, and $^{252}$Cf, in addition to other isotopes present in much smaller concentrations. The growth of the nuclear industry has given rise to the need for an interrogation system to perform rapid, quantitative assays of low fissile content wastes and scraps contained in high or low density matrices. The present invention relates generally to quantitative assay of generic transuranic wastes and more particularly to pulsed thermal-neutron interrogation of samples for the presence of fissile materials, combined with performance of a sequence of active and passive neutron measurements which yields accurate and sensitive assay values of up to seven simultaneously contained transuranic waste isotopes.

The apparatus and method of the instant invention measures prompt and delayed fission neutron yield and counts the coincidence of emitted prompt neutrons produced as a result of active neutron interrogation. With these three independent attributes of thermal neutron fission, one can uniquely determine the masses present of three or fewer fissile isotopes contained in a package such as a 208 l barrel of transuranic waste. Indeed, there are only three important fissile isotopes; $^{233}$U, $^{235}$U and $^{239}$Pu. Further, measurement of the passive coincident neutron yield and multiplicity and the passive noncoincidence neutron yield, all resulting from natural spontaneous fission processes which release neutrons or from spontaneous alpha particle emission which particles produce neutrons upon colliding with oxygen nucleii present in the sample, allows the determination of up to four additional isotopes contained in the sample to be analyzed. Therefore, by solely measuring neutrons one can analyze a sample containing up to three fissile isotopes and four non-fissile isotopes with 1 mg sensitivity for $^{239}$Pu or $^{235}$U in standard 208 l barrels filled with a variety of common waste and scrap materials.

U.S. Pat. No. 3,786,256 issued to Samuel Untermeyer on Jan. 15, 1974 describes a method and apparatus for nuclear fuel assay with a neutron source and coincident fission neutron detectors. Therein he teaches coincident neutron and gamma emission measurements, obtaining the required discrimination from thermal interrogation neutrons and the desired fission neutrons by this procedure. The method of the instant invention, on the other hand, does not require any gamma emission measurements (and in fact our detectors are quite insensitive to gamma radiation), and although teaching coincidence neutron measurements as independent observations which enter the algorithm for quantitative determination of various isotopes, also teaches both time-resolved single neutron measurement of fast fission neutrons, and total passive neutron flux determination. Untermeyer's apparatus and method are stated to be useful in both the passive mode and with neutron interrogation. Our invention provides an analytical procedure for up to three simultaneously contained fissile isotopes. Untermeyer's allows for one only. Measurement of the total passive neutron lux allows four non-fissile isotopes to be quantitatively determined by our method, while Untermeyer can only determine three such isotopes. Moreover, Untermeyer does not teach combining the active and passive neutron measurements to simultaneously evaluate both fissile and non-fissile components in a waste sample. Untermeyer's apparatus utilizes organic scintillators which are sensitive to both neutrons and gamma radiation the detection of which is taught. The apparatus of the instant invention utilizes $^3$He detectors which are gamma insensitive and necessarily that way to enable the collected counts to be relatable to the number of neutrons present especially for highly radioactive samples. Finally, Untermeyer teaches the use of a one at a time neutron emission neutron source to avoid false counts, whereas our invention allows many interrogation neutrons to be used simultaneously, the necessary discrimination being derived from the use of a pulsed interrogation neutron source and specially designed $^3$He neutron detection packages. The pulsed interrogation source allows us to use time domain discrimination between interrogating neutrons and fast fission signal neutrons. The $^3$He neutron detection packages allow us to detect signal neutrons with high sensitivity while rejecting interrogation neutrons with a rejection factor of $10^8$.

"A 1nCi/g Sensitivity Transuranic Waste Assay System Using Pulsed Neutron Interrogation," by W. E. Kunz, J. D. Atencio, and J. T. Caldwell was published on Nov. 1, 1980 in Proceedings, 21st Annual Meeting of The Institute of Nuclear Materials Management in Palm Beach, FL, June 30–July 2, 1980, Vol. IX, page 131. Therein the authors describe an apparatus for determining the total amount of fissile material present in a transuranic waste sample. The apparatus is designed to detect prompt fission neutrons to the exclusion of the thermalized interrogation neutrons and any delayed neutron emission. To obtain the increased sensitivity to fission neutrons, heavy detector shielding is used to stop all but the fast neutrons, thereby significantly reducing the neutron background, but in so doing losing information critical to the instant apparatus and method. One major change has been made in the apparatus of applicants' invention. Although Kunz et al. mention the use of a bare, low pressure $^3$He internal flux monitor designed to keep track of the interrogation neutron flux, and applicants' invention describes several unshielded detectors which measure the passive neutron emission and the delayed neutron production, both important for the isotopic assay of the instant method, the low pressure detector taught by Kunz is designed to be operated in high neutron fluxes and is therefore too insensitive to be useful for observing delayed neutrons which the authors teach away from doing.

Thus by including the measurement of the total neutron flux for both active and passive interrogations, and delayed neutron emission for active interrogations, in addition to the coincidence neutron emission suggested by Untermeyer, one can quantitatively determine the amounts of three fissile isotopes and four non-fissile isotopes at sensitivities of at least 10 nCi/g, as opposed to Untermeyer's one fissile and three non-fissile isotope analysis for which he does not quote sensitivity limits (practical instrumentation based on the Untermeyer concept generally has a fissile assay sensitivity 1000 times poorer than that obtained with practical instrumentation using the instant concept). The reason for the improvement rests on the fact that our invention utilizes a greater number of independent measurements, thereby increasing the number of variables we can uniquely solve for and uses time-domain (pulsed neutron interrogation) measurements which significantly increase sensitivity. The use of a pulsed interrogating neutron source arose from the realization that cadmium shielded $^3$He detectors are very sensitive devices for discriminating between thermal interrogation and fast fission neutrons, that delayed neutron intensity was also of great utility, and finally that pulsed thermal fission coincidence neutron detection could be easily used to glean additional information from the sample.

Fortunately, it turns out that the major non-fissile isotopes present in 99% of transuranic wastes from nuclear power reactors in the United States are four in number ($^{241}$Am, $^{252}$Cf, $^{244}$Cm and $^{240}$Pu; any $^{242}$Pu present being lumped together with the $^{240}$Pu). Further, the major fissile isotopes of interest in the waste material are $^{233}$U, $^{235}$U, and $^{239}$Pu; any $^{241}$Pu present affects the resulting neutron counts by less than 1%. Our method then allows the simple, non-destructive quantitative analysis of most waste materials from nuclear power and weapons materials production reactors which was not previously possible.

SUMMARY OF THE INVENTION

An object of the instant invention is to provide a method and apparatus for quantitative analysis of transuranic wastes from nuclear power and weapons materials production reactors for fissile and non-fissile isotopic content.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the method of this invention may comprise:

(a) Repetitively quantitatively measuring the background or passive neutron emission from a sample containing principally the natural neutron emitters $^{240}$Pu, $^{244}$Cm, $^{252}$Cf which neutrons arise as a result of spontaneous fission of these isotopes, and the spontaneous alpha emitters, principally $^{241}$Am, which alphas in collision with oxygen isotopes almost universally present since nuclear fuel is currently manufactured and used in the oxide form, also produce neutrons. The abovementioned four radioisotopes are the primary spontaneous neutron emitting, non-fissile constituents of transuranic waste material from nuclear power reactors, other spontaneous neutron emitting non-fissile isotopes being present in smaller quantities only. The above measurement includes total neutron flux and also coincidence neutron emission up to four simultaneous neutrons;

(b) Periodically irradiating the sample with a pulsed neutron source external to the sample, and measuring the total fast neutron flux emerging as a result of fissioning of any fissile isotopes present, the delayed neutron flux derived from neutron emission from the fission fragments, and the coincidence neutron emission for two simultaneous neutrons. These three measurements give enough information to determine the $^{233}$U, $^{235}$U, and $^{239}$Pu concentrations in the sample. These are all of the significant fissile isotopes so that the method of the instant invention can determine the quantity and identity of virtually all fissile material present. The neutron irradiation and fissile neutron measurements occur alternately with the passive neutron emission until enough neutron counts are recovered to give reliable statistics; and (c) Using sets of linear equations to solve for the masses of the fissile and non-fissile isotopes. The system is to be calibrated using standard $^{252}$Cf and $^{239}$Pu sources for the passive and active responses, respectively, the coefficients appearing in the aforementioned algorithms thereby being uniquely determined.

In a further aspect of the present invention, in accordance with its objects and purposes, the apparatus hereof may also comprise a pulsed neutron generator external to the sample under investigation, several shielded $^3$He proportional counters for detecting fast fission neutrons to the exclusion of any thermalized neutrons, a bare $^3$He proportional counter for detecting total interrogating neutron flux, suitable electronics for extracting signals from the proportional counters and averaging a plurality of pulsed neutron interrogations and passive periods, a container or housing comprised of neutron moderating material which slows the pulsed neutrons from the high energy neutron source to velocities where they are most effective in inducing fission in the fissile isotopes present, and contains and supports the sample under investigation, the proportional counters and the neutron source. The proportional counters and pulsed neutron source are located within the moderating material assembly. The materials to be assayed are generally placed within a cavity at the center of the moderating materials to maximize the efficiency of the assay.

Preferably, the neutron moderating container is constructed from polyethylene and graphite, and the moderating material surrounding the $^3$He detectors are polyethylene. It is also preferred that the neutron absorbing shields surrounding the fast neutron detectors are made of cadmium. Finally, it is preferred that the pulsed neutron source be of the D+T variety producing about $10^6$, 14—MeV neutrons per pulse, and be capable of a repetitive pulse rate of at least 20 per second.

The apparatus and method of the instant invention is capable of quantitative analysis of transuranic waste material from nuclear power reactors. It is substantially insensitive to the form or composition of the waste sample, and derives its utility from the simple detection of neutrons. Use of $^3$He proportional counters gives effective insensitivity to gamma radiation so that the reactor wastes can be considerably radioactive without altering the inherent detection sensitivity.

A major difficulty encountered in coincidence neutron counting in state of the art systems is avoided in the present detection system. This difficulty is the accommodation to a large dynamic range of neutron count rates. For very low count rates the entire neutron detection system, both bare and cadmium wrapped detectors, are utilized. This results in the high sensitivity required for low count rate materials. Very high count rate material is accommodated very simply by electronically switching off the bare detector portion of the system and using only the cadmium shielded portion. In this fashion spontaneous neutron sources spanning a dynamic range of about a factor of $10^6$ may be investigated.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 6(a) shows the averaged induced-fission prompt-neutron time-history obtained with a 17 g foil of $^{235}$U at the center of a 7.5 cm thick cylindrical shell of polyethylene in the assay chamber, while FIG. 6(b) shows the averaged induced-fission prompt-neutron time-history obtained with just the 17 g foil placed in the assay chamber, after $10^4$ pulses from the neutron generator.

DETAILED DESCRIPTION OF THE INVENTION

Figure 1:
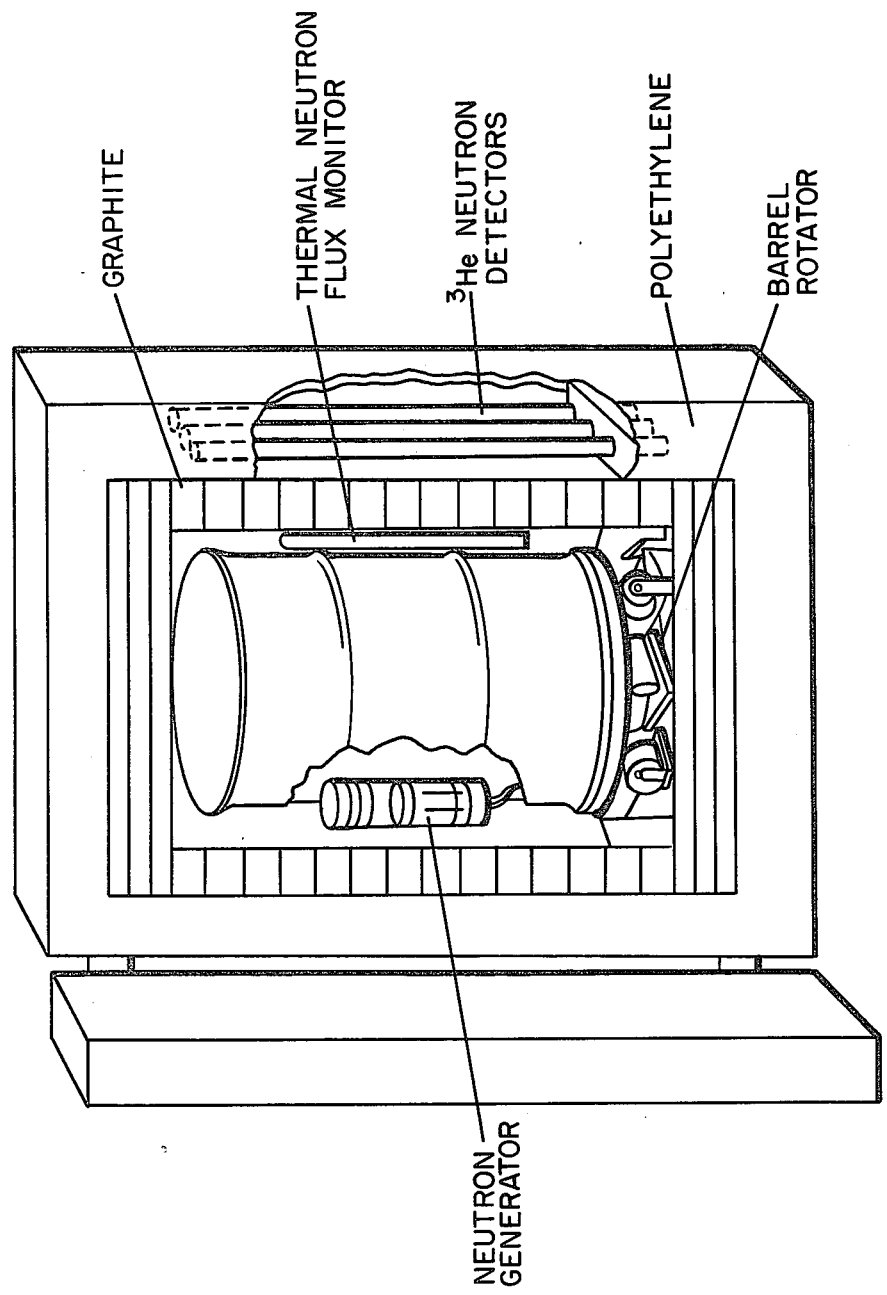
FIG. 1 schematically shows the location of the major components of the apparatus for analysis of transuranic wastes from nuclear power plants.

Reference will now be made in detail to the present preferred embodiment of the invention, an example of which is illustrated in the accompanying drawings. p The apparatus and method of the instant invention combines passive and active neutron measurements on a sample of transuranic wastes from nuclear power or weapons materials production reactors with an algorithm which relates such measurements to the fissile and radioactive non-fissile isotopes present therein. The detailed description of our invention will comprise the procedure for the evaluation of the masses of the non-fissile isotopes present, the evaluation of the masses of the fissile isotopes present, the details of the apparatus, and examples of the actual procedure.

About 99% of all transuranic wastes from nuclear power reactors in the United States contain principally the following spontaneous neutron emitting non-fissile isotopes; $^{240}$Pu, $^{241}$Am, $^{244}$Cm, and $^{252}$Cf. Their quantitative evaluation comprises the passive portion of the multi-isotopic neutron based assay analysis which consists of making neutron multiplicity measurements from neutrons emitted spontaneously by the constituent isotopes. The isotopic species, $^{241}$Am, is not a neutron emitter. However, since 99% of the radioisotopes involved in transuranic wastes exist in chemical combination with oxygen, the alpha particles spontaneously and naturally emitted by the americium collide with the isotopes of oxygen present in the sample and produce neutrons which can be detected as single neutron events; that is, at most one neutron is emitted in an alpha particle reaction. About two neutrons per second for each millicurie of isotopic americium present is customarily observed. Spontaneously fissioning isotopes such as $^{252}$Cf (average number of neutrons per fission=3.78), $^{244}$Cm (average number of neutrons per fission=2.69), and $^{240}$Pu (average number of neutrons per fission=2.17) emit bunches of time correlated neutrons with the indicated average number of neutrons per fission. The detected distribution of neutron multiplicities is different for each individual isotope and by measuring the multiplicity distribution of an unknown mixture of such isotopes, the individual quantities of each may be determined. Clearly, an unlimited number of unknowns in such a mixture cannot be uniquely assayed. For the four principle isotopes present in transuranic wastes, the number of events of spontaneous emission of up to four neutrons must be measured. From this information, one can uniquely solve a system of four equations for the masses of the isotopic species. It should be mentioned that the method of the instant invention requires the a priori information that the aforementioned isotopes are present with only minor concentrations of any others. If this is not true, and a different set of isotopes is present, then the algorithm to be described below will not give correct results unless coefficients characteristic of the new isotopes are inserted in the equations. Thus, although, as mentioned above, most transuranic wastes contain the aforementioned isotopes, any deviation therefrom would have to be determined independently and supplementally from our method. Define $P_1$ to be the background corrected single neutron emission rate, $P_2$ the measured net simultaneous double neutron emission rate, $P_3$ the measured simultaneous net triple neutron emission rate, and $P_4$ the measured simultaneous neutron emission rate for four neutrons. The emitted neutron multiplicity distribution for each of the spontaneous fissile isotopes may be found in the literature; for example, see Earl K. Hyde, Fission Phenomena, Vol. III, (1965), the disclosure of which is hereby incorporated by reference. The relationship between the isotope specific neutron multiplicity distribution and what can actually be observed in the laboratory for a spontaneously fissioning nucleus appears in J. T. Caldwell and E. J. Dowdy, Nucl. Science and Eng., 56, 179 (1975), the disclosure of which is also hereby incorporated by reference. The sum of similar relationships for the four isotopes in question may be written in a form that is very convenient to use in an experimental assay situation and which is independent of neutron detection efficiency. If we define $I_{241}$ to be the actual number of millicuries (mCi) of $^{241}$Am present in the sample, $I_{252}$ to be the actual number of microcuries ($\mu$Ci) of $^{252}$Cf present, $I_{244}$ the number of mCi of $^{244}$Cm, and $I_{240}$ to be the number of mCi of $^{240}$Pu, then we have the following system of four equations in four unknowns:

$$P_1 = C_1[I_{252} + 0.0351\, I_{244} + 0.00283\, I_{240} + 0.00154\, I_{241}] \quad (1)$$

$$P_2 = C_2[I_{252} + 0.0236\, I_{244} + 0.00066\, I_{240}]$$

$$P_3 = C_3[I_{252} + 0.0148\, I_{244} + 0.00032\, I_{240}]$$

$$P_4 = C_4[I_{252} + 0.0076\, I_{244} + 0.00015\, I_{240}].$$

The constants $C_1$, $C_2$, $C_3$ and $C_4$ are calibration constants determined experimentally for a given detection system. If a readily available $^{252}$Cf source is used for the calibration procedure, then $C_i = P_i$, the observed multiplicity responses, for a 1 μCi $^{252}$Cf source. None of equations (1) are multiples of one another, and the ratio of coefficients in each equation is considerably different from that of any other equation, which means that the four equations can be solved uniquely for the four isotopic concentrations $I_i$. That is, an experimental measurement of neutron multiplicities up to order 4 is sufficient to determine the quantities of the four passive neutron emitters present in the sample under investigation. In the event that there are other passive neutron emitting transuranic isotopes than the aforementioned most commonly present species, similar equations are easily derived; that is, for four spontaneously fissioning emitters instead of three spontaneously fissioning emitters plus an (α, n) emitter. As mentioned, the instant invention, in order to be applied successfully, requires a list of the expected isotopes present obtained from an external source. In summary, then, passive neutron multiplicity measurements are repetitively made until the data accumulated can be uniquely analyzed for the isotopic masses present. In the time periods where the passive neutron multiplicities are not being measured, active neutron measurements are taking place, as will be described below.

To determine the quantities of the fissile isotopes present, we again note that there are only three important fissile isotopes: $^{239}$Pu, $^{233}$U, and $^{235}$U. The procedure here is to repetitively irradiate the sample with short bursts of neutrons, and to investigate the prompt neutron yield, $Y_P$, the delayed neutron yield, $Y_D$, and the coincidence prompt neutron yield for two or more simultaneously emitted fission neutrons, $Y_C$. These three measurements are made effectively simultaneously during alternate cycles to the passive neutron measurements immediately following the interrogation neutron bursts, repetitively until enough counts have been gathered to make the measurements statistically significant. Similarly to equations (1) above, a set of three equations can be derived which uniquely determines the masses of the fissile isotopes present:

$$Y_P = C_1'[M_{239} + 0.62 M_{233} + 0.67 M_{235}] \quad (2)$$

$$Y_D = C_2'[M_{239} + 0.76 M_{233} + 2.02 M_{235}]$$

$$Y_C = C_3'[M_{239} + 0.75 M_{233} + 0.70 M_{235}]$$

Here $C'_1$, $C'_2$, and $C'_3$ are calibration constants which can be evaluated by using $^{239}$Pu as a calibration source; $C'_1$ = the number of prompt neutrons per unit mass of $^{239}$Pu per unit number of interrogating neutrons, $C'_2$ = delayed neutron yield per unit mass of $^{239}$Pu per unit number of interrogating neutrons, and $C'_3$ = coincidence prompt neutron yield per unit mass of $^{239}$Pu per unit number of interrogating neutrons. The set of prompt neutron coefficients for equations (2) have been determined by using the measured thermal neutron fission cross sections, and the number of prompt neutrons per fission for each of the three fissile isotopes as described in the Hyde reference above as are the derivations for the coefficients in the delayed neutron count equation, and those for the coincidence neutron equation. These coefficients, the coincidence neutron yield coefficients, and the delayed neutron coefficients are all scaled relative to $^{239}$Pu, so that they are independent of detector efficiency. Again, there are three equations for the three unknown masses of the fissile isotopes which can be solved uniquely for these masses.

Experience with a variety of matrix materials indicates an approximate ±25% level of assay accuracy using equations (2). If only a single matrix material is involved the accuracy can be made significantly better than ±25% by performing the calibration with identical matrix material to that of the waste sample.

In the Figures:

FIG. 1 shows the apparatus of the instant invention. The assay chamber consists of a graphite and polyethylene structure designed to accommodate waste or scrap packages as large as a standard 208 l barrel. Preferably, means for rotating these barrels to average out non-uniformities is provided. Preferably, the chamber will also have an inner liner of about 0.11 m thick graphite and an outer layer of about 0.17 m thick polyethylene. Interrogating neutrons are provided by a small, pulsed D+T neutron generator placed within the cavity of the chamber. The neutron generator used in our apparatus was developed by Sandia Laboratories and the General Electric Corporation, Neutron Devices Division. The preferable features of the pulsed neutron subsystem are: (a) 10-15 μs duration pulses; (b) variable repetition rate from 1 to 100 Hz; (c) $10^6$, 14 MeV neutrons per pulse output; and (d) average expected lifetime of about $5 \times 10^7$ pulses. The emitted 14 MeV neutrons are thermalized within a few tenths of a millisecond and have a subsequent characteristic lifetime within the chamber of about 1 ms. Cadmium shielded fast-neutron detectors surround the cavity and are embedded within the polyethylene moderating layer outside of the graphite layer. If there is no fissile material in the chamber these detectors record only background level after about 0.7 ms because they are insensitive to thermal neutrons. Moreover, they recover from the initial 14 MeV pulse overload in about 0.4 ms making them ideal for induced fission neutron counting in very concentrated samples of waste. That is, when the interrogating neutrons induce fission reactions in fissile isotopes within the waste or scrap package, ensuing prompt-fission neutrons are detected with high probability because of the high detector sensitivity. Preferably, $^3$He proportional counters are used to monitor the neutrons emitted as a result of neutron interrogation of the fissile isotopes, and those neutrons emitted from the passive, naturally occuring radioactive decay of the non-fissile isotopes present; cadmium-wrapped detectors are used for the former case while additional bare $^3$He proportional counters are generally used for the latter as well as for delayed neutron measurements on the fissile isotopes. Preferably, low-pressure $^3$He proportional counters are used to monitor the interrogating flux since, by virture of their lower efficiency and sensitivity, they do not saturate in the intense neutron flux involved. Such detectors are placed inside the chamber cavity instead of within the moderating layers. Preferably, the fast-neutron detectors are shielded from the thermal neutrons by a wrapping of about 0.16 cm thick cadmium. The measured combined detection efficiency for 12 shielded detectors in an early embodiment of the apparatus of the instant invention was about 5% using a bare $^{252}$Cf calibration source. The ratio of prompt-fission neutron detector counts to the interrogating flux monitor counts is proportional to the amount of fissile material present from all isotopes. The measured sensitivity for total $^{239}$Pu, $^{233}$U and $^{235}$U was found to be about 1 mg located anywhere within a 208 l barrel of typical transuranic waste matrix, with a spatial flatness of response of about ±10%, for that previously used apparatus. This efficiency was substantially improved for coincidence or event multiplicity determinations, as well as for extending the invention to smaller amounts of fissile material present in the waste samples, and delayed neutron measurements. In a preferred embodiment of the present invention the total counting efficiency was increased to about 15% by adding 16 bare $^3$He proportional counters to the detector system. These counters, when incorporated into the chamber walls, have almost three times the counting efficiency for fission neutrons as the cadmium-wrapped counters. However, since they are sensitive to thermal neutrons, they are useless during the fissile material neutron interrogation until all of the pulse-produced thermal neutrons have died away; which is on the average about 20 ms after the pulse. Therefore, for prompt and delayed neutron determinations, the interrogation neutrons are pulsed at about 20 Hz, prompt neutrons counted from 0.7 to about 4.7 ms, with the cadmium-wrapped counters, and delayed neutrons are counted with both the bare and cadmium-wrapped counters from 20 to 50 ms. Both the total quantity of fissile material present, the prompt-to-delayed ratio, and the coincidence count for two or more neutrons simultaneously emitted are measured during the same interrogation period. Passive measurements of neutron coincidences and event multiplicities are made during a separate measurement period with the neutron generator turned off. When using the combined cadmium-wrapped and bare counters, we are limited to rather low spontaneous neutron sample strengths (i.e., low density of spontaneous neutron emitting isotopes in the waste sample). That is, the thermal neutron lifetime for the chamber, and therefore that for the bare counters also is relatively long, thereby requiring a coincidence gate about 0.25 ms long. For strong fission neutron samples, the accidental coincidence rate admitted by such a long gate length would be prohibitive. But if only the cadmium-wrapped detectors are used (with a neutron lifetime of about 35 μs), a gate length of 35–70 μs is available, and because of the strong fission neutron source, the neutron coincidence and multiplicity measurements can be made successfully with only the less efficient cadmium-wrapped detection system without the bare counters being needed.

It should be mentioned at this point that most transuranic nuclear waste packages also emit strong gamma radiation fluxes. It is a fortunate feature of the $^3$He counters that they do not respond to such radiation, and therefore do not have to be corrected for variations in gamma radiation strength. A strong gamma radiation field affects fissile assay sensitivity only in an indirect fashion. With no system modifications, waste barrels producing up to 10 R/h contact gamma radiation can be tolerated. Counting electronics can be adjusted by increasing discriminator levels so as to bias out the effects of this radiation with no appreciable loss in neutron counting rate or efficiency. Ten centimeters of direct lead shielding in front of the $^3$He detector packages produced no significant change in observed sensitivity for fissile material although this thickness of lead would result in gamma dose rate reduction by a factor of about $10^3$ for typical hot irradiated wastes. Therefore, with simple replacement of the graphite directly in front of the detection packages with an equivalent thickness of lead, the assay system of the instant invention can be successfully operated without degradation in performance with very hot waste barrels producing contact dose rates up to about $10^4$ R/h. Greater amounts of lead shielding would allow operation with even hotter wastes and require only modest design changes.

Yet another problem is the effect of the spontaneous neutron emitters on the interrogation procedure for determining the fissile isotope content. To simulate the effects of strong self sources of neutrons on fissile assay sensitivity, a strong isotopic neutron source was placed within the assay cavity, and the pulsed measurements taken with known amounts of fissile isotopes present in the cavity. With a $1.26 \times 10^6$ n/s source in the cavity, $1.763 \times 10^6$ source background counts were observed during a typical 0.7–4.7 ms counting period, after $1 \times 10^4$ pulses or counting cycles were averaged. With this same spontaneous neutron source and a 500 mg sample of $^{235}$U in the cavity, a net induced fission signal of 74,400 counts above the background was detected with a 0.7–4.7 ms gate and $1 \times 10^4$ interrogation pulses. The experimentally determined $3\sigma$ signal level above the background (which we define as the detection limit of the instant apparatus) translates into a detection limit of about 27 mg of $^{235}$U, or a detection limit of about 18 mg of $^{239}$Pu in the presence of a $1.26 \times 10^6$ n/s source. This measured $3\sigma$ limit is readily scaled to different steady source backgrounds or to a different number of averaged pulses. For example, for a $10^4$ pulse interrogation (which corresponds to about 167 s elapsed time under usual conditions) and a $1.0 \times 10^7$ n/s steady source neutron background, the $3\sigma$ detection limit is 50 mg $^{239}$Pu. Finally, for a run of $4 \times 10^4$ pulses and a $1.0 \times 10^7$ n/s background, the $3\sigma$ detection limit is 25 mg $^{239}$Pu. The pulsed neutron assay system of our invention is therefore suitable for the fissile assay of hot irradiated fuel wastes, even in the situation where extremely high self-neutron and gamma radiation levels are generated by the sample (up to $10^7$ n/s of self-neutron flux and up to 10,000 R/h of contact gamma radiation).

The data acquisition subsystem and all counting electronics are standard commercially available equipment. Preferably, separate, fast recovery preamplifier and amplifier units are used for each detector package. A multiple discriminator unit is used to provide fast logic pulses for input to a minicomputer. The multiscale pulse time-histories from the detector packages and the flux monitors are stored on magnetic disk for a comprehensive permanent record and for future more elaborate analysis if required.

Figure 2:
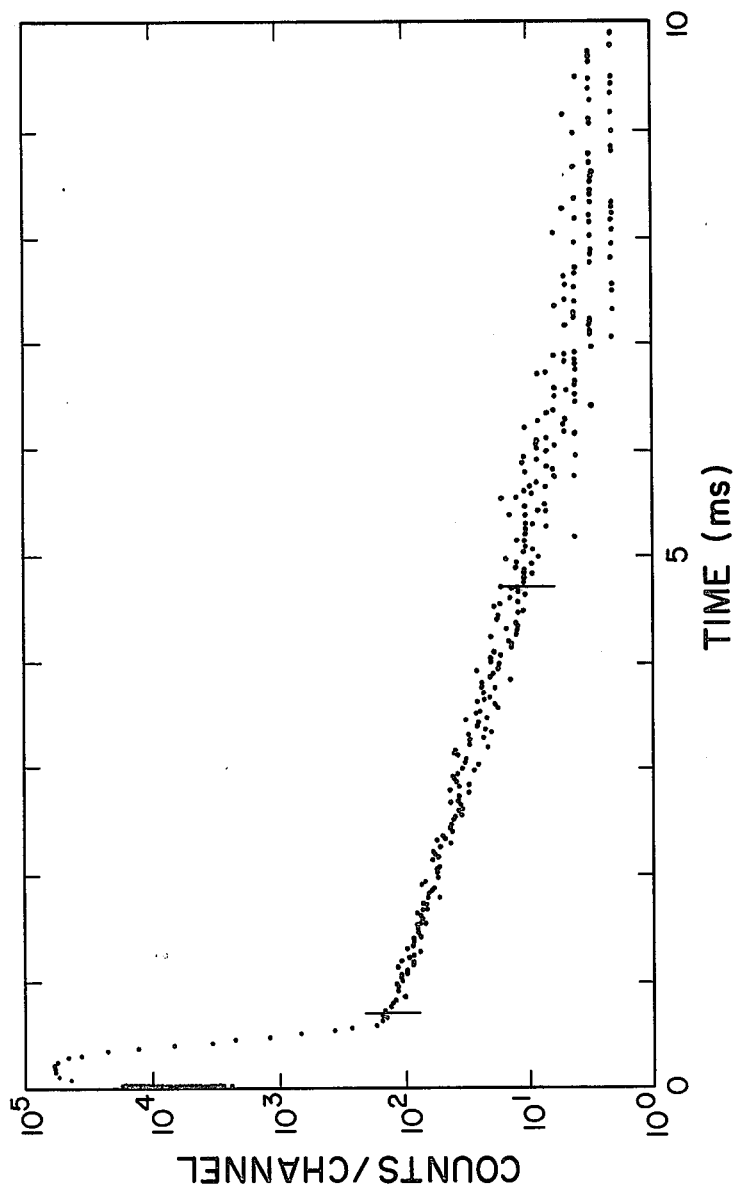
FIG. 2 shows the averaged time-history for prompt-fission neutron emission from a 500 mg sample of $^{235}$U placed at the geometric center of the assay chamber after $10^4$ pulses from the neutron generator.

FIG. 2 shows the characteristic time-history of the prompt-fission neutron detection packages obtained using a 500 mg sample of $^{235}$U placed at the geometric center of the assay chamber. Ten thousand pulses from the neutron generator were averaged and the dwell time was 10 μs per channel. The trace took about 167 s to run.

Figure 3:
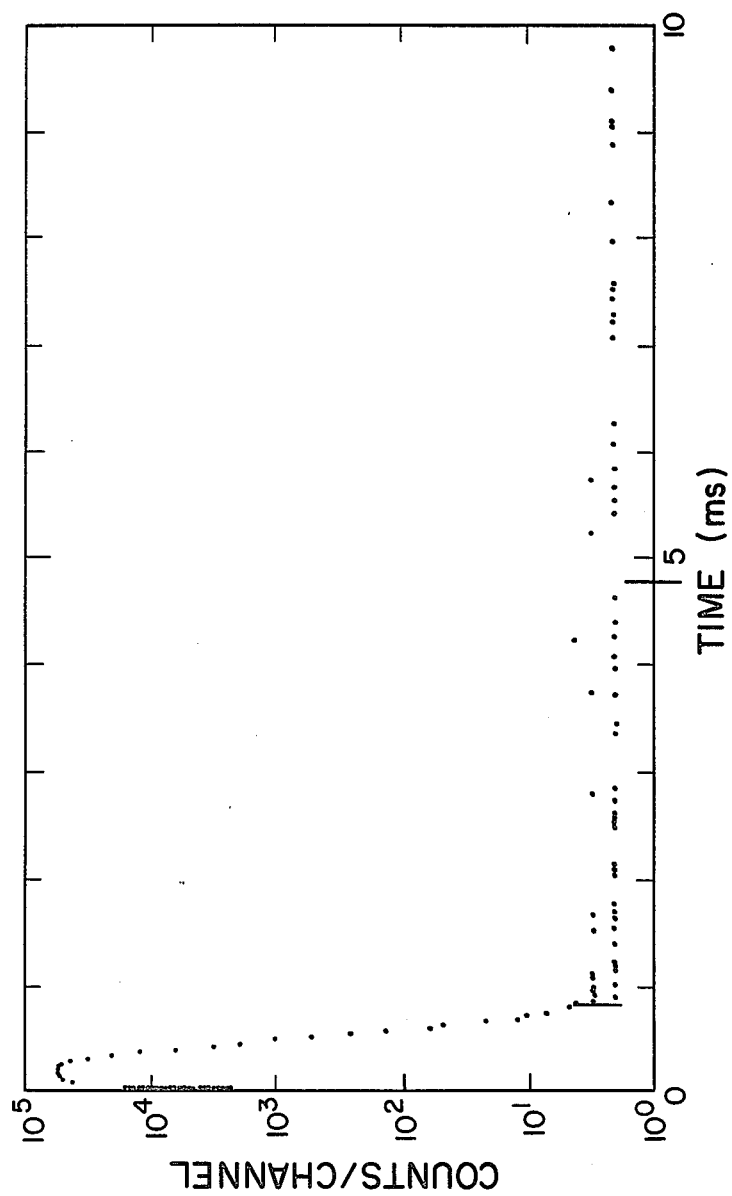
FIG. 3 shows the averaged time-history for prompt-fission neutrons for $10^4$ pulses from the neutron source with no fissile material present.

FIG. 3 shows the corresponding response obtained with no sample in the assay chamber. Again, only the prompt-fission neutron detection system was used, $10^4$ pulses from the D+T generator were averaged, and the dwell time was 10 μs per channel. As can be seen, the shielded detection system recovers from the 14 MeV neutron saturation in about 0.2 ms and has reached the baseline rate by about 0.7 ms. By comparing FIGS. 2 and 3, it is seen that the signal-to-background ratio reaches a usable level at about 0.4 ms and attains a maximum value near 0.7 ms. The net prompt-fission neutron signal is obtained by using the time interval 0.7 to 4.7 ms marked by the vertical lines in FIGS. 2–4. The $^{235}$U assay sensitivity obtained from this data ($3\sigma$ above background net signal point) is about 1.3 mg. The corresponding value for $^{239}$Pu assay is about 0.9 mg, and that for $^{233}$U is 1.3 mg. Linearity of response is quite good over the range 1 to $10^5$ mg for $^{235}$U, $^{233}$U or $^{239}$Pu in a dispersed medium.

Figure 4:
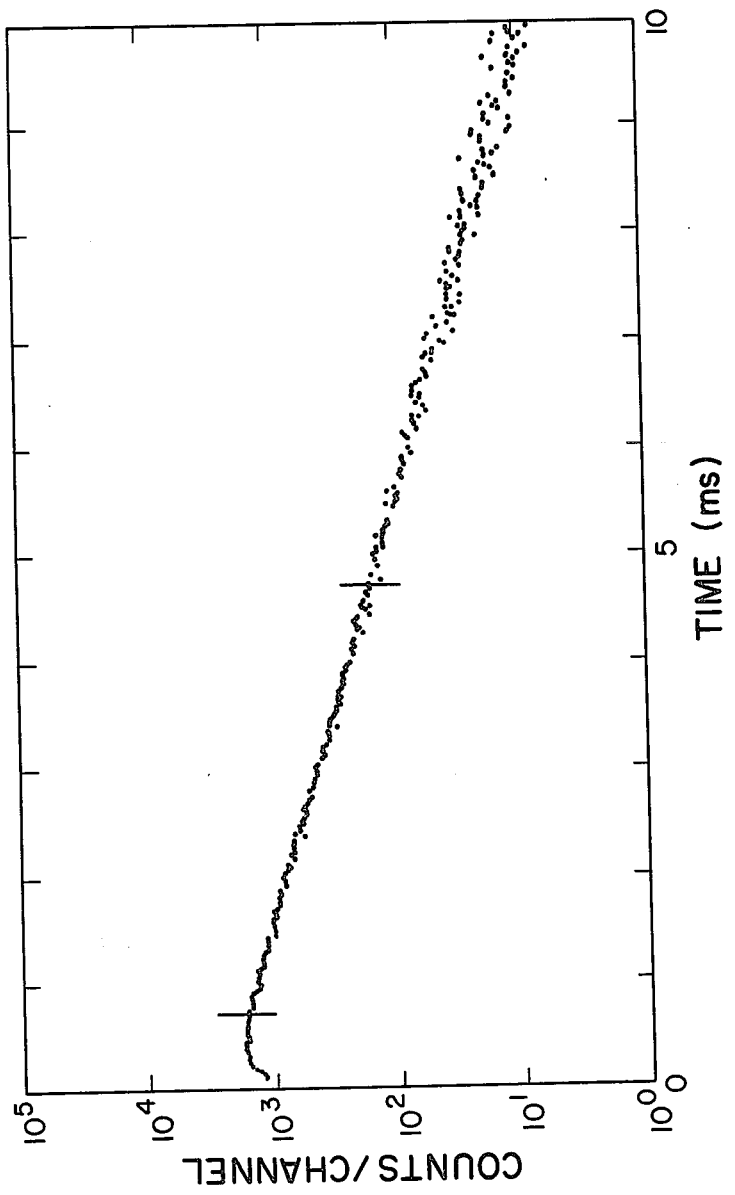
FIG. 4 shows the averaged time-history for the thermal-neutron flux in the assay chamber for $10^4$ pulses from the neutron source as measured by a bare $^3$He detector.

FIG. 4 shows the response of the thermal-neutron flux monitors for $10^4$ pulses for conditions that correspond to the prompt-fission neutron data shown in FIGS. 2 and 3. Since the flux monitor counters are operated at low $^3$He pressure to avoid count rate saturation, the observed response is an accurate measure of the actual interrogating flux time-history. The assayed value of total fissile material is, to first order, obtained by simply dividing the net prompt fission detector counts over a specified time interval by the corresponding chamber flux monitor counts for the same time interval. The count time interval is adjusted to obtain maximum sensitivity for a given set of conditions. The delayed neutron measurements and those for neutron multiplicity for two neutrons simultaneously emitted are further discussed below and complete the information needed for equations (1).

Figure 5:
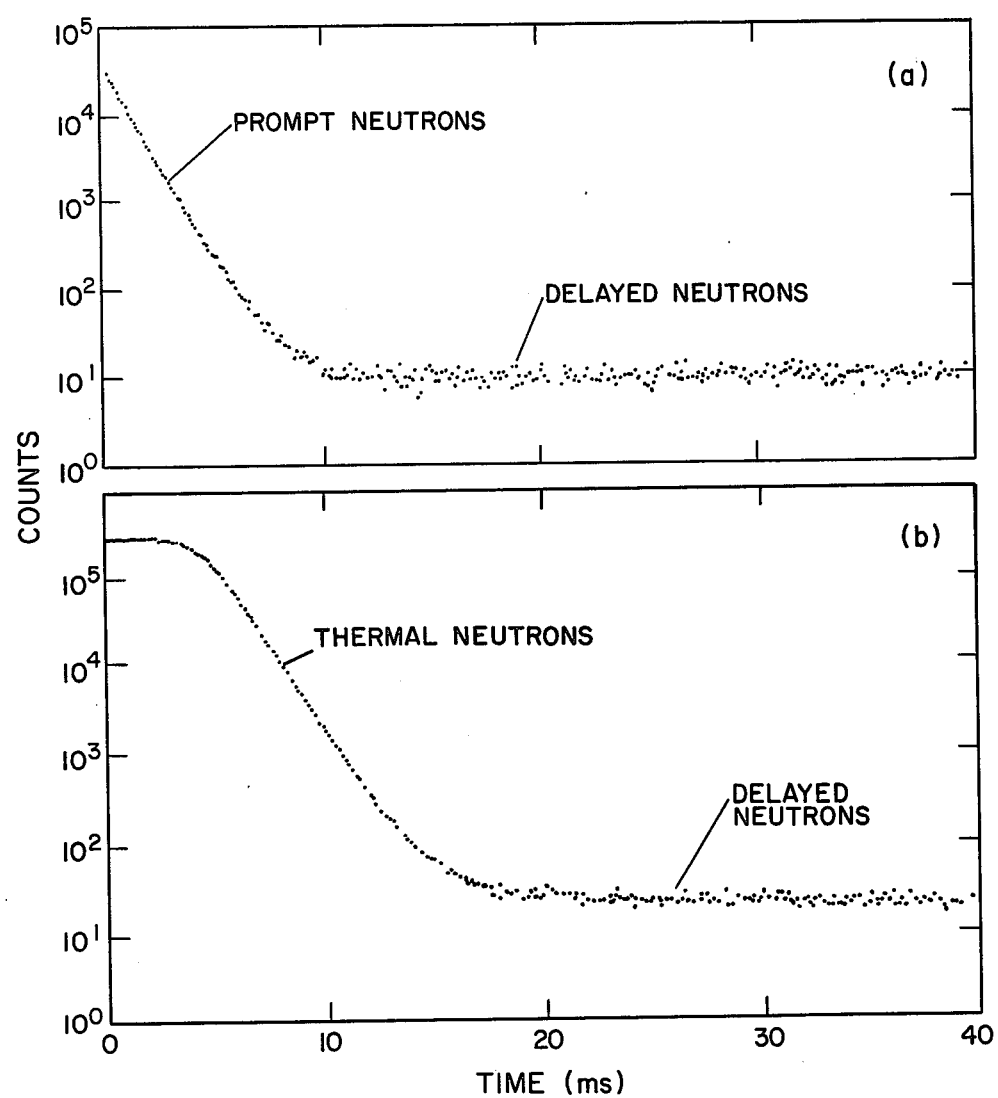
FIG. 5 shows the averaged overall time evolution of the delayed neutrons as measured by (a) the shielded neutron detectors and (b) the bare neutron detector for $10^4$ pulses from the neutron generator.

FIG. 5(a) shows the averaged shielded detector response to 17 g of $^{235}$U foil placed at the geometric center of the assay chamber for $10^4$ pulses. The exponentially decaying response (0.7-10 ms) is the prompt neutron yield (here about $2 \times 10^6$ counts). The flat region is the delayed yield of which about 10% is cosmic ray neutron background. FIG. 5(b) shows the bare detector response to the same $^{235}$U sample. Here the exponential part of the trace derives principally from the interrogating thermal neutrons and is therefore of little interest. The flat part (after about 20 ms), however, is produced by the delayed neutrons and is an approximately four times larger signal than that derived from the shielded detectors.

Figure 6:
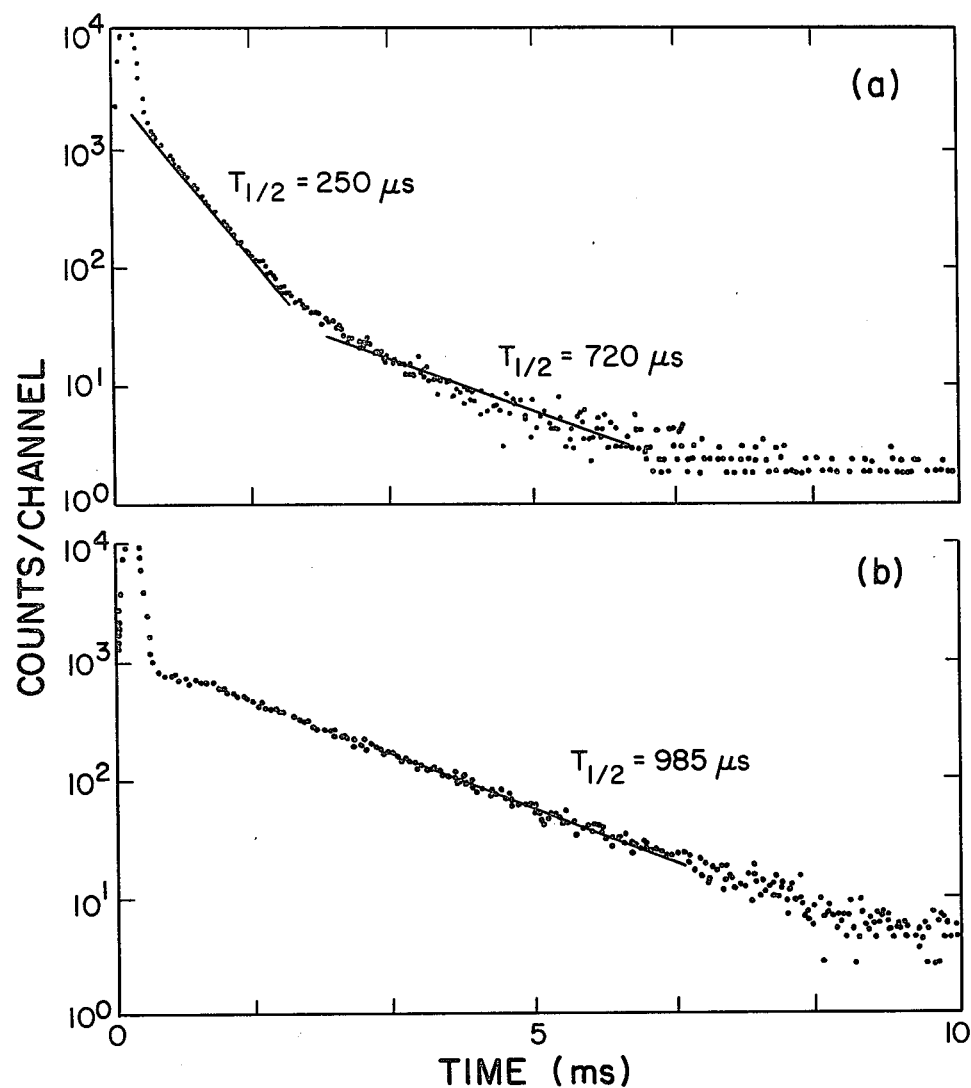

Matrix effects have been shown to affect fissile material assay by about ±25% in the worst cases. Systematic measurements on a series of 208 l barrels filled with an assortment of typical waste matrix materials, such as wet rags, iron scrap, cement, Pyrex glass, dirt, polyethylene scrap, chloride compounds and sludge have been performed. Such investigations have shown that typical hydrogeneous matrices such as polyethylene scrap, wet rags, or wet dirt, for example, lead to a characteristic two-component induced-fission time-history. This is shown in FIG. 6(a), and is to be compared with matrices in which no significant hydrogen is present, an example of which is shown in FIG. 6(b). The relative decay times of the two components are related to the hydrogen content of the matrix. The thermal neutron lifetime within the interrogation cavity generally also reflects the overall neutron absorption properties of the waste matrix. For example, a 200 kg loading of miscellaneous scrap iron in a 208 l barrel results in an observed cavity half-life ($T_{\frac{1}{2}}$) about 50% reduced from the nominal empty barrel case. Thus, in our automated data analysis procedure, pulsed, time-history data is subjected to an on-line, multi-component least-squares fit to determine the shape and magnitude of the emitted neutron flux as a function of time and the barrel matrix contents. This information informs us if the accuracy of the measurement will be close to the ±25% worst case limits or considerably more accurate. FIG. 6(a) was derived from measurements with a 17 g $^{235}$U foil placed at the center of a 7.5 cm thick polyethylene cylindrical shell placed in the chamber cavity. The initial shorter $T_{\frac{1}{2}}$ component is attributable to interrogation neutrons thermalized directly within the polyethylene cylindrical shell while the longer $T_{\frac{1}{2}}$ component is attributable to interrogation neutrons that are thermalized within the assay chamber walls. FIG. 6(b), on the other hand, shows the induced-fission neutron time-history obtained with the same $^{235}$U foil placed bare in the assay chamber. Here only a single exponential falloff component observed, indicating an interrogation neutron contribution solely from the chamber walls.

The above detailed description of the apparatus and procedure concentrated most heavily on the determination of the fissile material assay because most of the experimental difficulty of our invention resides in these measurements. The same apparatus is used for the non-fissile isotope determinations, and the entire analytical procedure is best presented by example. Therefore, to illustrate the more general method of the instant invention, the following examples are presented.

EXAMPLE 1

Use of the instant apparatus and method to screen unspecified but suspected transuranic (TRU) waste at the 10 nCi/g level:

a. Passive neutron multiplicity measurement (i.e., from $^{241}$Am, $^{252}$Cf, $^{240}$Pu, and $^{244}$Cm). Presented here are passive neutron multiplicity data taken on a 208 l barrel of suspected TRU waste obtained from a nuclear industry source:

$P1 = 0.3 \pm 0.2$ cps $P2 = -0.1 \pm 0.1$ cps $P3 = -0.001 \pm 0.010$ cps $P4 = -0.007 \pm 0.007$ cps, from which, after using equations (1), one concludes that there are no transuranic spontaneous neutron emitters present in quantities of 0.5 mCi or greater.

b. Pulsed active neutron measurements on the same barrel give an observed normalized prompt neutron yield of $5 \pm 3 \times 10^{-4}$ for the instant apparatus for which 10 mg of $^{239}$Pu produced a normalized prompt neutron yield of $2.5 \times 10^{-3}$. Therefore fissile transuranic isotopes are present in quantities of less than 2 mg (0.14 mCi). Since this barrel (barrel and matrix weight=110 kg) contains less than 10 nCi/g (actually it contains 1 nCi/g) of total transuranic isotopes it is not legally tansuranic waste.

EXAMPLE 2

Use of the instant apparatus and method to assay a 208 l barrel of well-characterized nuclear fuel processing plant waste. This waste sample is known to contain only $^{235}$U as a fissile component. No other fissile isotopes are involved in the fuel fabrication process. Only the pulsed active measurement is pertinent in this case.

Measured normalized prompt neutron yield (same calibration as used in Example 1) is 1.30. Using the calibration constant, $C'_1 = 2.5 \times 10^{-3}$ obtained with a 10 mg $^{239}$Pu sample and equations (2) the barrel is found to contain 7.8 g of $^{235}$U. Measured normalized delayed neutron yield (a calibration constant, $C'_2$, from equations (2) of 0.0013) obtained with a 1 g sample of $^{239}$Pu for the same barrel is 0.0198. Therefore, the barrel must contain 7.5 g of $^{235}$U, and the two independent assays of the same barrel agree as they should. One concludes, using the average of the two assays, that the barrel contains 7.65±0.15 g of $^{235}$U. The confidence in this value is considerably greater than if only one assay value were available.

EXAMPLE 3

Assay of another barrel of transuranic waste obtained from a nuclear industry source containing both spontaneous neutron emitters and fissile isotopes.

a. Passive neutron multiplicity measurement:

$P_1 = 246.8 \pm 0.4$ cps $P_2 = 25.1 \pm 0.2$ cps $P_3 = 2.02 \pm 0.06$ cps $P_4 = 0.104 \pm 0.020$ cps.

This data is interpreted using equations (1), with constants obtained using a 0.24 μCi $^{252}$Cf source. (The observed $^{252}$Cf count rates were normalized to values obtained with a 1.0 μCi source):

$C_1 = 558.$ cps $C_2 = 73.0$ cps $C_3 = 8.28$ cps $C_4 = 0.91$ cps.

One concludes that most of the neutrons being emitted by this barrel are from about 15 mCi of $^{244}$Cm [equations (1)]. Quantities on the order of 1 mCi of the other three components are perhaps present as the limits of experimental error do not exclude this possibility.

b. Pulsed active neutron measurement. Normalized prompt neutron yield is 0.0357 using the same calibration constants as Examples 1 and 2. Background rates were too high to permit measurement of delayed neutron yield. Using equations (2), one finds that no more than 140 mg (10 mCi) of $^{239}$Pu are present in this barrel. Therefore, this barrel contains considerably more than the 10 nCi/g lower limit legally defining transuranic waste (barrel and matrix weight=90 kg so there are 280 NCi/g of transuranic isotopes present), which means that it must be stored in the permanent retrieval status appropriate for transuranic wastes.

$Y_c$ has been measured under actual field conditions; that is, using transuranic waste samples derived from industrial sources, but not included in the above Examples.

In conclusion, an apparatus and method are presented whereby the fissile isotopes $^{233}$U, $^{235}$U and $^{239}$Pu and the non-fissile isotopes $^{240}$Pu, $^{241}$Am, $^{244}$Cm and $^{252}$Cf predominantly present in over 99% of spent nuclear fuels from power reactors can be assayed by counting emitted neutrons and emitted neutron multiplicities during alternate neutron interrogation and passive cycles, and making use of a simple mathematical algorithm. In the event that other isotopes are present, the algorithm can be changed such that three fissile isotopes and four non-fissile isotopes can be quantitatively determined once their identity is established by other means. The invention is quite insensitive to substantial gamma radiation intensity, thereby making it generally usable.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for quantitative assay of a sample of generic transuranic waste containing a mixture of the fissile isotopes $^{239}$Pu, $^{233}$U, and $^{235}$U, and the non-fissile isotopes $^{240}$Pu, $^{241}$Am, $^{244}$Cm and $^{252}$Cf, using a first and second neutron detection apparatus, which comprises the steps of:
   (a) calibrating the first neutron detection apparatus using a standard $^{252}$Cf neutron source;
   (b) calibrating the first and second neutron detection apparatus using a standard $^{239}$Pu sample and a pulsed neutron source external to said $^{239}$Pu sample;
   (c) repetitively quantitatively determining passive neutron emission from the sample for specific time intervals until a useful magnitude of signal has been accumulated using the first neutron detection apparatus, which further comprises the steps of: (i) measuring passive neutron coincidence multiplicity yields, $P_2$, $P_3$, and $P_4$, to quantitatively determine the amount of spontaneously fissioning isotopes present; and (ii) measuring the noncoincidence neutron yield, $P_1$, which in combination with said passive neutron coincidence yield measurements provides the amount of non-spontaneously fissioning $^{241}$Am present through the known production rate of neutrons from the reaction of emitted alpha particles with any oxygen isotopes present in the sample;
   (d) periodically irradiating the sample with pulsed neutrons from a source external to said sample to induce nuclear fission in the fissile isotopes present in the sample;
   (e) quantitatively determining the active neutron emission subsequent to said neutron irradiation step and resulting from said pulsed neutrons inducing fission with release of fission neutrons in the fissile isotopes present in the sample using the second neutron detection apparatus which is insensitive to said passive neutron emission repetitively and during alternate periods to said passive neutron emission determining step until a useful magnitude of signal has been accumulated, which further comprises the steps of: (i) measuring the prompt neutron yield, $Y_P$; (ii) measuring the delayed neutron yield, $Y_D$; and (iii) measuring the coincidence prompt neutron yield, $Y_C$;
   (f) solving the following set of four linear equations in four unknowns for the I's, where $I_{252}$ is the actual number of microcuries (μCi) of $^{252}$Cf present in said sample and $I_{241}$, $I_{240}$ and $I_{244}$ represent the actual numbers of millicuries (mCi) of $^{241}$Am, $^{240}$Pu and $^{244}$Cm present in said sample, respectively, and $P_1 = C_1[I_{252} + 0.0351$
$I_{244} + 0.00283 I_{240} + 0.00154 I_{241}]$ $$P_2 = C_2[I_{252} + 0.0236 I_{244} + 0.00066 I_{240}]$$

$$P_3 = C_3[I_{252} + 0.0148 I_{244} + 0.00032 I_{240}]$$

$$P_4 = C_4[I_{252} + 0.0076 I_{244} + 0.00015 I_{240}],$$

where $P_1$ is said measured background corrected noncoincidence single neutron rate of detection, and $P_2$, $P_3$ and $P_4$ are said measured, background corrected multiply coincident neutron rates of detection for two, three, and four simultaneously formed neutrons, respectively, and $C_1$, $C_2$, $C_3$ and $C_4$ are the observed multiplicity responses for a 1.0 μCi $^{252}$Cf calibration source; and (g) solving the following set of three linear equations in three unknowns for the M's, where $M_{239}$, $M_{233}$ and $M_{235}$ are the actual masses present of $^{239}$Pu, $^{233}$U and $^{235}$U, respectively, and $C_1$, $C_2$ and $C_3$ are calibration constants representing the number of prompt neutrons per unit mass of $^{239}$Pu, the number of delayed neutrons per unit mass of $^{239}$Pu, and the number of coincidence prompt neutrons per unit mass of $^{239}$Pu, respectively; $Y_P$, $Y_D$ and $Y_c$ having been determined in said active neutron emission determining step:

$$Y_P = C_1[M_{239} + 0.67 M_{235} + 0.62 M_{233}]$$

$$Y_D = C_2[M_{239} + 2.02 M_{235} + 0.76 M_{233}]$$

$$Y_C = C_3[M_{239} + 0.70 M_{235} + 0.75 M_{233}].$$

2. An apparatus for quantitative assay of a sample of generic transuranic waste containing predominantly a mixture of the fissile isotopes $^{239}$Pu, $^{233}$U, and $^{235}$U, and the non-fissile isotopes $^{240}$Pu, $^{241}$Am, $^{244}$Cm and $^{252}$Cf, which is capable of passive and active time resolved neutron detection which comprises:

(a) an intense, pulsed neutron generator external to the sample;

(b) a neutron moderating structure which surrounds the sample and said external pulsed neutron source, and which slows down emitted neutrons from said neutron generator such that they become efficient in inducing fission in the fissile isotopes, further comprising a layer of graphite and a layer of polyethylene;

(c) a plurality of bare $^3$He proportional counters for detecting both passive and delayed fission neutrons located within the walls of said moderating structure;

(d) a plurality of cadmium-shielded $^3$He proportional counters for detecting all neutrons located within the walls of said moderating structure, said cadmium-shielded proportional counters having no sensitivity for thermalized neutrons;

(e) at least one bare $^3$He proportional counter located inside said neutron moderating structure for detecting said moderated neutron flux from said pulsed neutron source;

(f) means for extracting, time resolving, averaging over a plurality of neutron interrogation cycles, and analyzing signals appearing on said bare and cadmium-shielded neutron detectors; and (g) means for extracting, averaging over a multiplicity of passive neutron emission periods, and analyzing signals appearing on said bare and cadmium-shielded neutron detectors.

3. The apparatus described in claim 2 which further comprises a sample rotator to average said first and second neutron detector response to localized high concentrations of fissile, and non-fissile but radioactive material.

4. The apparatus described in claim 3 wherein said polyethylene layer is about 17 cm thick, said graphite layer is about 11 cm thick, and said neutron absorbing material is cadmium about 0.16 cm thick.

5. The apparatus described in claim 4, wherein said pulsed neutron generator further comprises a pulsed D+T fusion, 14 MeV neutron source and capable of: (a) 10 to 15 μs duration pulses; (b) repetition rate variable from 1 to 100 Hz; (c) about $10^6$ neutrons per pulse output; and (d) stable neutron output.

* * * * *